Figure 1:
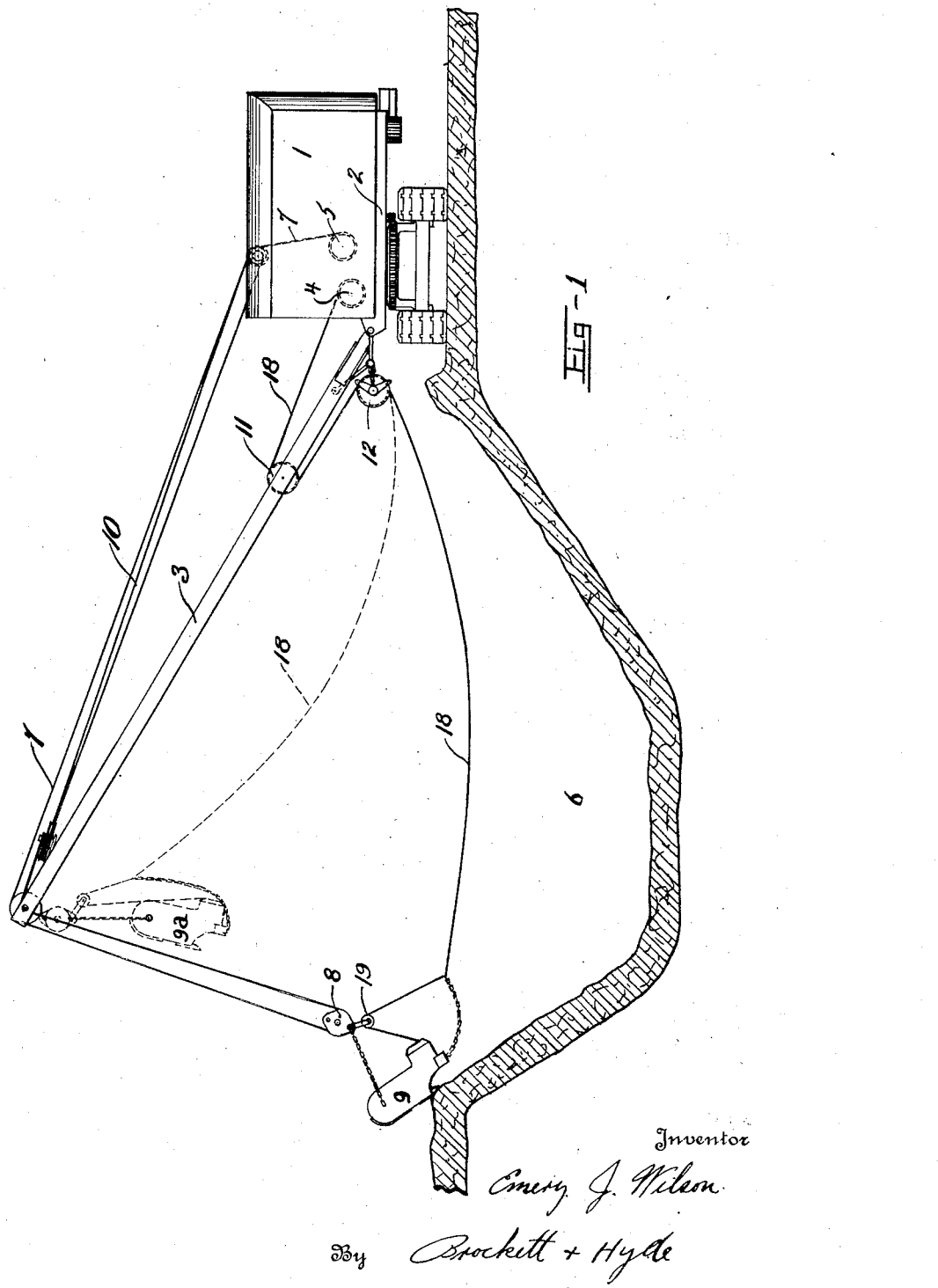

Nov. 13, 1928.

E. J. WILSON 1,691,100

DRAG LINE ARRANGEMENT

Filed April 16, 1926

2 Sheets-Sheet 1

Inventor
Emery J. Wilson
By Brockett + Hyde
Attorneys

Nov. 13, 1928.  
E. J. WILSON  
DRAG LINE ARRANGEMENT  
Filed April 16, 1926
1,691,100
2 Sheets-Sheet 2
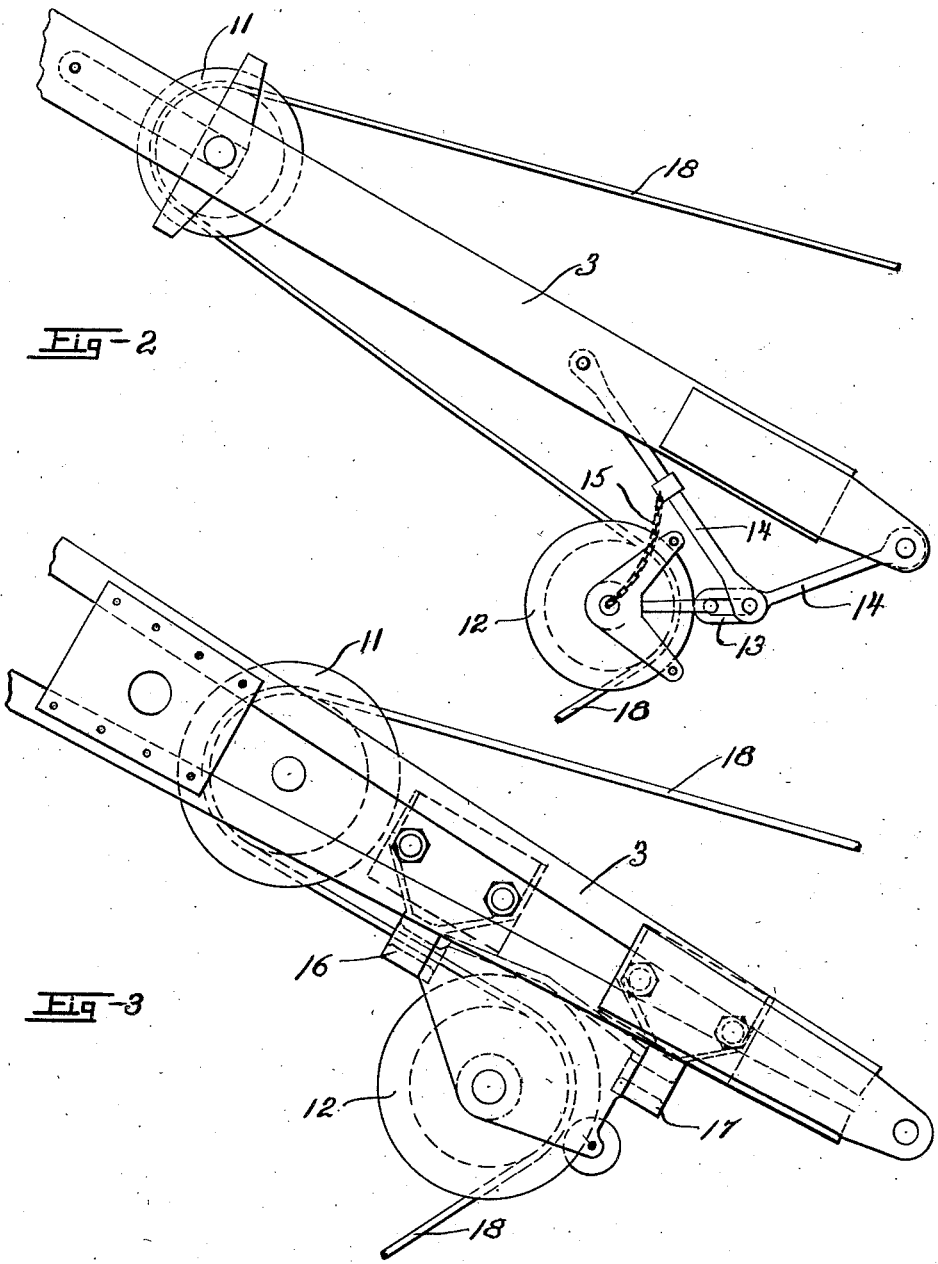

Patented Nov. 13, 1928.

1,691,100

UNITED STATES PATENT OFFICE.

EMERY J. WILSON, OF CLEVELAND, OHIO, ASSIGNOR TO THE THEW SHOVEL COMPANY, OF LORAIN, OHIO, A CORPORATION OF OHIO.

DRAGLINE ARRANGEMENT.

Application filed April 16, 1926. Serial No. 102,478.

This invention relates to an arrangement in the drag line commonly employed in connection with a drag bucket or scoop operated as to an auxiliary or alternate use of an ordinary power shovel.

The objects of the invention are to provide an arrangement of guiding sheaves and such means, for directing the drag line as to result in a minimum of wear and tear upon the line in use and to this end to provide a simple arrangement of guiding sheaves capable of easily adapting itself to any of the various positions which the drag line is required to assume in use.

The invention will be readily understood from the following description taken in connection with the accompanying drawings in which Fig. 1 shows a power shovel rigged for accommodation to drag bucket operations, together with the general arrangement of the rigging, and showing the bucket in two of its typical operating positions; Fig. 2 is a detail of the boom of the shovel, showing the arrangement of sheaves employed in my invention and Fig. 3 is a detail similar to that of Fig. 2 but showing an alternate arrangement of sheaves.

In the drawings 1 represents generally a typical "power shovel", the principal parts of which, in so far as my invention is concerned are a turn table 2 at the forward end of which is hinged the heel of the boom 3, and which carries, enclosed within a suitable housing, operating mechanism including the drag line winding drum 4, and the hoist drum 5; the shovel being shown in operating position adjacent a partially completed excavation 6. The boom is supported by a connection such as the line 10, extending between a suitable portion of the shovel frame, and the upper or free end of the boom.

Passing from the hoist drum is a hoist cable 7 which leads over a sheave mounted at the free end of the boom around a co-operating sheave 8 attached to the drag bucket 9, and being firmly secured at the end of the boom; whereby upon rotation of the hoist drum, the drag bucket is either raised or lowered depending upon the direction in which the drum is revolved. Somewhat near the hinge end of the boom, is a sheave 11 mounted to turn freely upon a horizontal shaft passing through the side members of the boom, the sheave being positioned between the side members. Adjacent the heel of the boom is another sheave 12 which I mount beneath the boom in such a manner as to be capable of free swinging movement laterally. In the construction shown in Fig. 2 this is accomplished by means of the link 13 interpositioned between the sheave frame, and members 14 secured to the boom; the short chains 15 serving to limit the downward swing of the sheave. In the construction shown in Fig. 3 the sheave 12 is swiveled by mounting the sheave frame to freely swing upon the bearings 16 and 17 in suitable brackets secured upon the boom. From the drag line drum I arrange the drag line 18 to pass first over the sheave 11 down through the boom, back over the sheave 12 and out to a suitable and well known connection with the drag bucket as illustrated in Fig. 1.

In operation the drag mechanism is manipulated as a unit in a manner similar to that already customary in the art. Beginning with the drag bucket in the position shown in solid lines in the drawing, the bucket is dragged inwardly along the surface of the excavation gradually accumulating a load during this movement, which is accompanied by a suitable slack of the hoist cable accompanied by a winding motion of the drag line drum. As the bucket approaches the heel of the boom it assumes an upright load-carrying position and when this position is reached, with a maximum load in the bucket the cable motions are reversed causing the bucket to move upwards toward the free end of the boom. During this motion the drag line is only paid out as the hoist cable is hauled in so that the upright position of the bucket is maintained by the drag line passing over the sheave 19.

When the bucket reaches its uppermost position at the end of the boom the entire shovel including the boom is swung by means of the turn table mechanism until the bucket is over a conveying receptacle or dumping position as the case may be; whereupon by a slacking of the drag line the bucket is emptied by gravity, assuming the position 9ª with respect to the remainder of the mechanism, after which the bucket is returned in an obvious manner to its original position and the cycle repeated.

Although the operation described is a typical one and theoretically the normal position of the bucket will be always in the vertical plane of the boom, skilled operators habitually manipulate the turn table so that its motion overlaps the cable operated actuation of the bucket; the result being frequent considerable horizontal angularity of the drag line with respect to the boom. Various expedients have been devised to make allowance for this angularity; most of such expedients heretofore consisting in mounting a plurality of idling sheaves at the base of the boom. Serious difficulties have resulted however, from this arrangement, the most effective result being a considerable shortening of the useful life of the drag line. It will be obvious that my invention is an arrangement doing away with these difficulties yet making full allowance for any possible side motion of the drag line. The most advantageous position of the line with respect to the boom and the winding drum being maintained, yet the possible positions of the bucket with respect to the boom being unlimited.

What I claim is:

1. A drag line arrangement comprising a turn-table, a boom hinged at its heel to one end of said table, a winding drum on said table adjacent the heel of said boom, a sheave carried by said boom and spaced thereon from said drum, a sheave mounted for lateral swinging movement adjacent the heel of said boom, a scoop adjustably suspended from the free end of said boom, and a drag line passing from said drum, over said sheaves in the order named and to said scoop.

2. A drag line arrangement comprising a turn-table, a boom hinged at its heel to one end of said table, a winding drum on said table adjacent the heel of said boom, a sheave on said boom spaced thereon from said drum, a sheave pivoted for lateral swinging movement on said boom adjacent the heel thereof, the location of the sheave pivot being such that a common tangent between said sheaves lies substantially parallel with said boom in any position of said pivoted sheave, a scoop adjustably suspended from the free end of said boom, and a dragline passing from said drum, over said sheaves in the order named, and to said scoop.

In testimony whereof I hereby affix my signature.

EMERY J. WILSON.